(12) United States Patent
Kawabata et al.

(10) Patent No.: US 12,446,756 B2
(45) Date of Patent: Oct. 21, 2025

(54) IMAGE PROCESSING APPARATUS, IMAGE PROCESSING METHOD, AND STORAGE MEDIUM FOR AUTOMATIC RECORDING OF PREDETERMINED NUMBER OF ENDOSCOPE IMAGES

(71) Applicant: OLYMPUS CORPORATION, Tokyo (JP)

(72) Inventors: Yuya Kawabata, Tokyo (JP); Makoto Kitamura, Tokyo (JP); Akihiro Kubota, Tokyo (JP); Yamato Kanda, Tokyo (JP)

(73) Assignee: OLYMPUS CORPORATION, Tokyo (JP)

( * ) Notice: Subject to any disclaimer, the term of this patent is extended or adjusted under 35 U.S.C. 154(b) by 361 days.

(21) Appl. No.: 17/861,628

(22) Filed: Jul. 11, 2022

(65) Prior Publication Data
US 2022/0345659 A1 Oct. 27, 2022

Related U.S. Application Data

(63) Continuation of application No. PCT/JP2020/001476, filed on Jan. 17, 2020.

(51) Int. Cl.
*H04N 5/76* (2006.01)
*A61B 1/00* (2006.01)
(Continued)

(52) U.S. Cl.
CPC ...... *A61B 1/00009* (2013.01); *A61B 1/00006* (2013.01); *A61B 1/0002* (2013.01);
(Continued)

(58) Field of Classification Search
CPC ............ A61B 1/00009; A61B 1/00006; A61B 1/0002; A61B 1/2736; A61B 1/0638;
(Continued)

(56) References Cited

U.S. PATENT DOCUMENTS

2002/0118278 A1* 8/2002 Kobayashi ............. G16H 30/20
382/130
2008/0279431 A1 11/2008 Kitamura
(Continued)

FOREIGN PATENT DOCUMENTS

EP 2 149 330 A1 2/2010
EP 2 910 173 A1 8/2015
(Continued)

OTHER PUBLICATIONS

International Search Report dated Mar. 24, 2020 received in PCT/JP2020/001476.

*Primary Examiner* — Iriana Cruz
(74) *Attorney, Agent, or Firm* — Scully, Scott, Murphy & Presser, P.C.

(57) ABSTRACT

An image processing apparatus includes a processor. The processor receives endoscope images to be determined, in each of which an image of an inside of a body of a subject is picked up, determines whether or not an endoscope image for comparison concerning a predetermined inspection site, and the endoscope images to be determined are same or similar, determines whether or not an observation mode of each of the endoscope images to be determined is a condition suitable for automatic recording, and automatically records a predetermined number of the endoscope images to be determined in a recording unit, when the endoscope images to be determined and the endoscope image for comparison are determined to be the same or similar and when the observation mode is the condition suitable for automatic recording.

13 Claims, 10 Drawing Sheets

(51) Int. Cl.
*A61B 1/273* (2006.01)
*G06V 10/10* (2022.01)
*G06V 10/74* (2022.01)

(52) U.S. Cl.
CPC ............ *A61B 1/2736* (2013.01); *G06V 10/10* (2022.01); *G06V 10/761* (2022.01)

(58) Field of Classification Search
CPC .. A61B 1/000096; A61B 1/045; G06V 10/10; G06V 10/761; H04N 23/555; H04N 5/77
See application file for complete search history.

(56) References Cited

U.S. PATENT DOCUMENTS

| | | | | |
|---|---|---|---|---|
| 2011/0282148 | A1* | 11/2011 | Kase | A61B 1/0655 600/113 |
| 2012/0130171 | A1* | 5/2012 | Barak | G06T 7/74 600/117 |
| 2014/0303435 | A1* | 10/2014 | Taniguchi | G06T 7/0016 600/103 |
| 2014/0343358 | A1* | 11/2014 | Hameed | G02B 23/2423 600/109 |
| 2016/0007836 | A1* | 1/2016 | Kikuchi | A61B 1/00059 600/102 |
| 2016/0292498 | A1* | 10/2016 | Miura | A61B 1/01 |
| 2018/0242818 | A1* | 8/2018 | Kubo | A61B 1/005 |
| 2020/0248943 | A1* | 8/2020 | Nishio | F25B 13/00 |
| 2020/0268231 | A1* | 8/2020 | Kubo | G02B 23/24 |
| 2021/0012495 | A1* | 1/2021 | Kamon | G16H 50/20 |
| 2021/0042925 | A1* | 2/2021 | Usuda | A61B 1/0002 |
| 2021/0366110 | A1* | 11/2021 | Oosake | G06T 7/0012 |
| 2022/0076458 | A1* | 3/2022 | Shigeta | G06T 7/0012 |

FOREIGN PATENT DOCUMENTS

| | | |
|---|---|---|
| JP | 2002-253493 A | 9/2002 |
| JP | 2008-278964 A | 11/2008 |
| JP | 2010-051399 A | 3/2010 |
| JP | 2013-013569 A | 1/2013 |
| JP | 2016-189812 A | 11/2016 |
| WO | 2014/061553 A1 | 4/2014 |
| WO | 2017/006618 A1 | 1/2017 |
| WO | 2019/130924 A1 | 7/2019 |

* cited by examiner

IMAGE PROCESSING APPARATUS, IMAGE PROCESSING METHOD, AND STORAGE MEDIUM FOR AUTOMATIC RECORDING OF PREDETERMINED NUMBER OF ENDOSCOPE IMAGES

CROSS REFERENCE TO RELATED APPLICATION

This application is a continuation application of PCT/JP2020/001476 filed on Jan. 17, 2020, the entire contents of which are incorporated herein by this reference.

BACKGROUND OF THE INVENTION

1. Field of the Invention

The present invention relates to an image processing apparatus configured to automatically record an image in which a predetermined inspection site is photographed, an image processing method, and a storage medium.

2. Description of the Related Art

Conventionally, an endoscope system has been widely used in the medical field and the industrial field. The endoscope system includes an endoscope configured to pick up an image of an object inside a subject, a processor configured to generate an observation image of the object, the image of which is picked up by the endoscope, and the like. In the primary examination of a stomach using such an endoscope system, recording of a highly comprehensive image is required in order to prevent a lesion from being overlooked in the secondary examination.

For example, Japanese Patent Application Laid-Open Publication No. 2010-51399 discloses an endoscope image recording apparatus that can automatically start and automatically stop recording of an endoscope image. The endoscope image recording apparatus determines whether or not an image signal obtained by the endoscope includes a threshold value or more of red. When it is determined that the image signal includes the threshold value or more of red, the endoscope image recording apparatus automatically starts recording of the image signal, and when it is determined that the image signal does not include the threshold value or more, the endoscope image recording apparatus automatically stops recording of the image signal.

SUMMARY OF THE INVENTION

An image processing apparatus of one aspect of the present invention includes a processor, wherein the processor receives endoscope images to be determined, in each of which an image of an inside of a body of a subject is picked up, determines whether or not an endoscope image for comparison concerning a predetermined inspection site, and the endoscope images to be determined are same or similar, determines whether or not an observation mode of each of the endoscope images to be determined is a condition suitable for automatic recording, and automatically records a predetermined number of the endoscope images to be determined in a recording unit, when the endoscope images to be determined and the endoscope image for comparison are determined to be the same or similar and when the observation mode is the condition suitable for automatic recording.

An image processing method of one aspect of the present invention receives endoscope images to be determined, in each of which an image of an inside of a body of a subject is picked up, determines whether or not an endoscope image for comparison concerning a predetermined inspection site, and the endoscope images to be determined are same or similar, determines whether or not an observation mode of each of the endoscope images to be determined is a condition suitable for automatic recording, and automatically records a predetermined number of the endoscope images to be determined in a recording unit, when the endoscope image for comparison and the endoscope images to be determined are determined to be the same or similar and when the observation mode is the condition suitable for the automatic recording.

A non-transitory storage medium in which an image processing program is stored of one aspect of the present invention causes a computer to execute a code for receiving endoscope images to be determined, in each of which an image of an inside of a body of a subject is picked up, a code for determining whether or not an endoscope image for comparison concerning a predetermined inspection site, and the endoscope images to be determined are same or similar, a code for determining whether or not an observation mode of each of the endoscope images to be determined is a condition suitable for automatic recording, and a code for automatically recording a predetermined number of the endoscope images to be determined in a recording unit, when the endoscope image for comparison and the endoscope images to be determined are determined to be the same or similar and when the observation mode is determined to be the condition suitable for automatic recording.

DETAILED DESCRIPTION OF THE PREFERRED EMBODIMENTS

Hereinafter, embodiments of the present invention are described with reference to the drawings.

Note that in each of the drawings used in the following explanation, the scale may be made different for each component in order to make each component have such a size as to be recognizable on the drawing. In other words, the present invention is not limited only to the numbers and quantities of the components, the shapes of the components, the ratios of the sizes of the components, and relative positional relationships of the respective components that are described in the drawings.

First Embodiment

Figure 1:
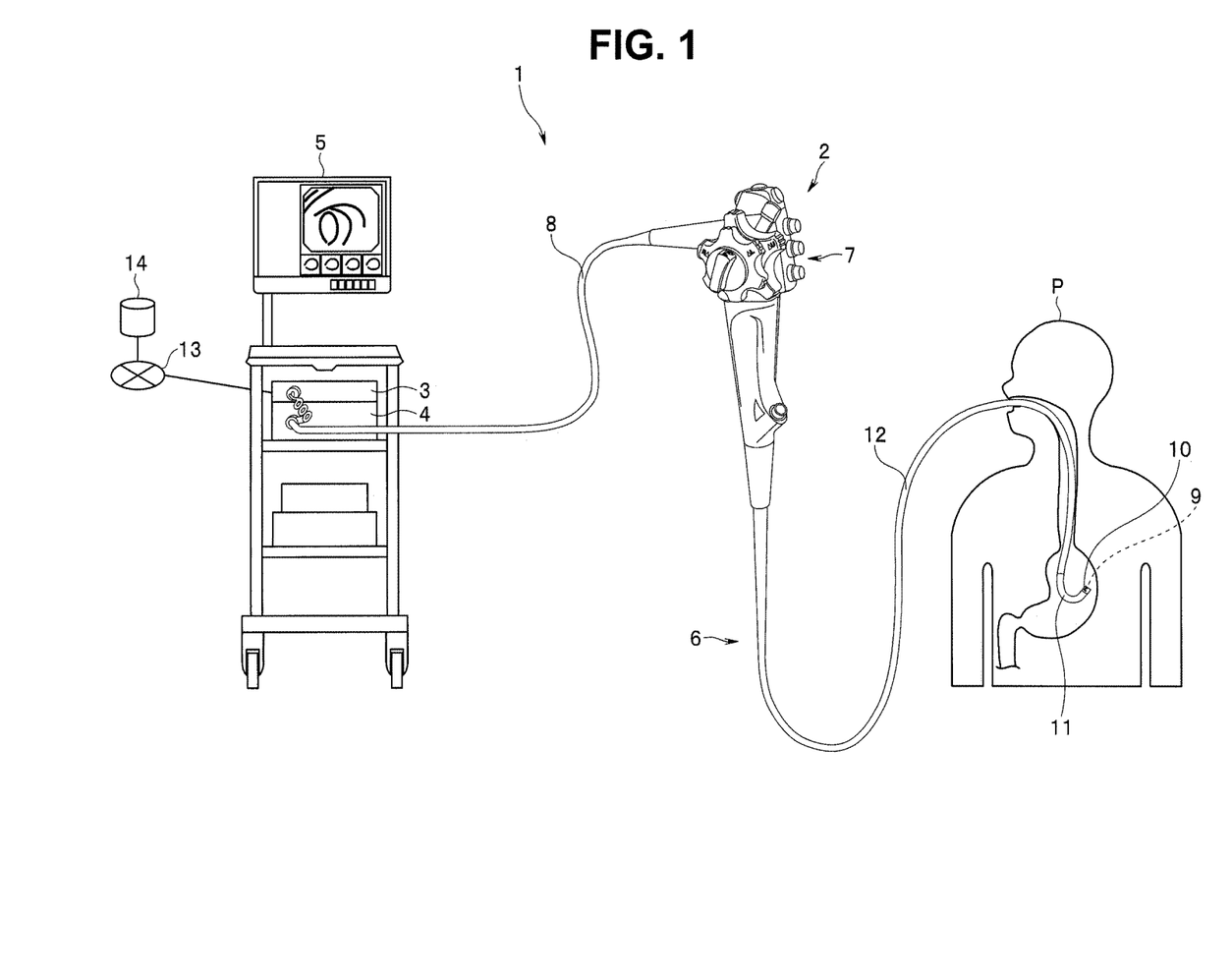
FIG. 1 is a view showing an entire configuration of an endoscope system according to a first embodiment of the present invention.
Figure 2:
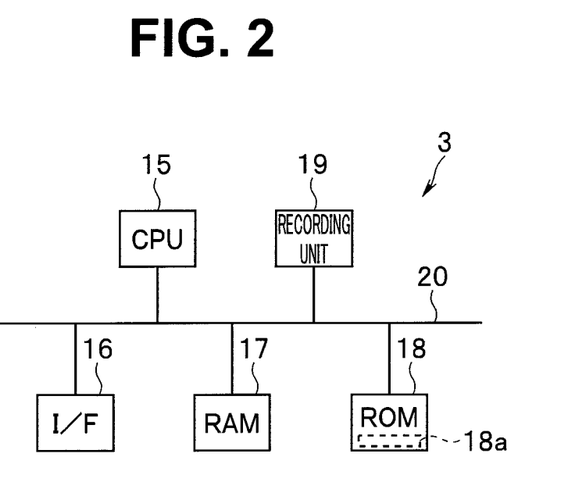
FIG. 2 is a diagram showing one example of a configuration of a video processor 3.
Figure 3:
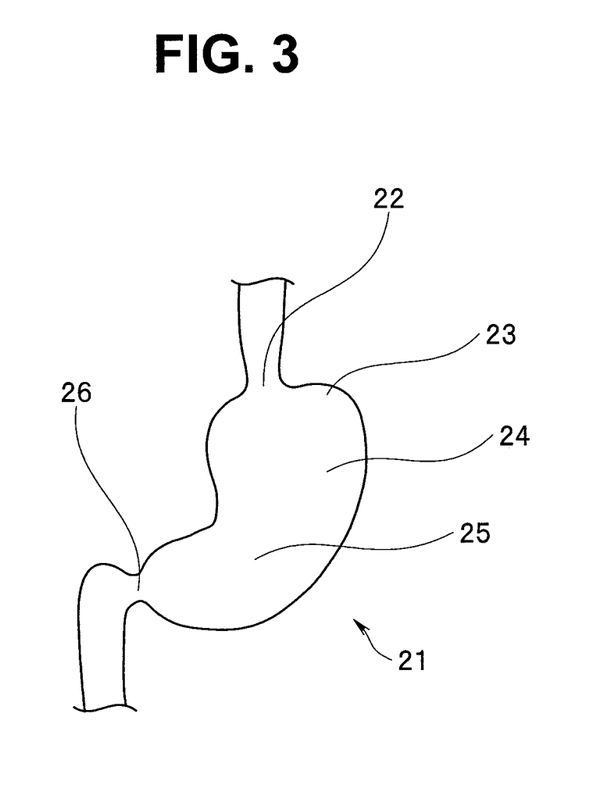
FIG. 3 is a view for explaining one example of a predetermined inspection site.

FIG. 1 is a view showing an entire configuration of an endoscope system according to a first embodiment of the present invention. FIG. 2 is a diagram showing one example of a configuration of a video processor. FIG. 3 is a view for explaining one example of a predetermined inspection site.

As shown in FIG. 1, the endoscope system 1 is a so-called endoscope system for an upper digestive tract. The endoscope system 1 mainly includes an endoscope 2, a video processor 3, a light source apparatus 4, and a display apparatus 5. The endoscope 2 includes an image pickup unit configured to pick up an image of an inside of a body of a subject P by inserting a distal end portion into a body cavity of a subject P and output an image signal of an object image. The video processor 3 serves as an image processing apparatus that includes an image processing unit configured to apply predetermined image processing to the image signal outputted from the image pickup unit in the endoscope 2 and is configured to comprehensively control an operation of the entire endoscope system 1. The light source apparatus 4 generates an illumination light for being emitted from a distal end of the endoscope 2. The display apparatus 5 displays an image to which the image processing is applied in the video processor 3.

The endoscope 2 includes an insertion portion 6 including an image pickup unit in a distal end portion and configured mainly by an elongated shape portion having flexibility, an operation unit 7 connected to a proximal end side of the insertion portion 6 and configured to receive input of various operation signals, and a universal cord 8 extended to a proximal end side from the operation unit 7 and connecting to the video processor 3 and the light source apparatus 4.

Here, the endoscope 2 includes a signal transmission line between the image pickup unit placed in the distal end portion of the insertion portion 6 and the image processing unit in the video processor 3. The signal transmission line is provided extensively from the image pickup unit in the insertion portion 6 to the image processing unit of the video processor 3 via respective insides of the insertion portion 6, the operation unit 7 and the universal cord 8 to transmit an image signal or the like from the image pickup unit.

The insertion portion 6 has a distal end portion 10 placed at a distalmost portion and contains an image pickup unit 9 including an image pickup device and the like, a bendable bending portion 11 placed on a proximal end side of the distal end portion 10 and configured by a plurality of bending pieces, and a long flexible tube portion 12 connected to a proximal end side of the bending portion 11 and having flexibility.

In the operation unit 7, a bending operation unit, various switches and the like are provided. The bending operation unit is operated when the bending portion 11 is caused to perform a bending operation. The various switches are, for example, a release switch, a freeze switch, an observation mode changeover switch for performing switch between a normal light observation (white light imaging: WLI) and narrow band light observation (narrow band imaging: NBI), or the like.

The video processor 3 is connected to a server 14 via the Internet 13. The video processor 3 can transmit an endoscope image picked up by the image pickup unit 9 to the server 14 via the Internet 13, and can receive desired data from the server 14 via the Internet 13.

As shown in FIG. 2, the video processor 3 is configured by having a CPU 15, an I/F 16, a RAM 17, a ROM 18, a recording unit 19, and a bus 20. The CPU 15, the I/F 16, the RAM 17, the ROM 18 and the recording unit 19 are connected to one another via the bus 20.

To the I/F 16, an endoscope image (image signal) picked up by the image pickup unit 9 of the endoscope 2 is inputted. In the ROM 18, an image processing program 18a is stored. The CPU 15 configuring the processor can execute an automatic recording process of an endoscope image described later by reading the image processing program 18a from the ROM 18, developing the image processing program 18a into the RAM 17 and executing the image processing program 18a.

In the recording unit 19 as a memory, an endoscope image for which automatic recording is determined to be executed by the automatic recording process described later is recorded.

In the present embodiment, the CPU 15 automatically records endoscope images of predetermined inspection sites in the recording unit 19. Here, the predetermined inspection sites are a cardia region 22, a gastric fundus region (fornix region) 23, a gastric body region 24, a gastric angle region 25, and a pylorus region 26 of a stomach 21, as shown in FIG. 3. Note that the predetermined inspection site is not limited to the stomach 21, but may be an oral cavity, a larynx, a pharynx, an esophagus, a duodenum, a small intestine, a large intestine or the like.

Here, display screen examples that are displayed on a display screen of the display apparatus 5 during endoscopy are described by using FIG. 4A to FIG. 4F.

FIG. 4A to FIG. 4F are views for explaining the display screen examples displayed on the display screen of the display apparatus.

Figure 4A:
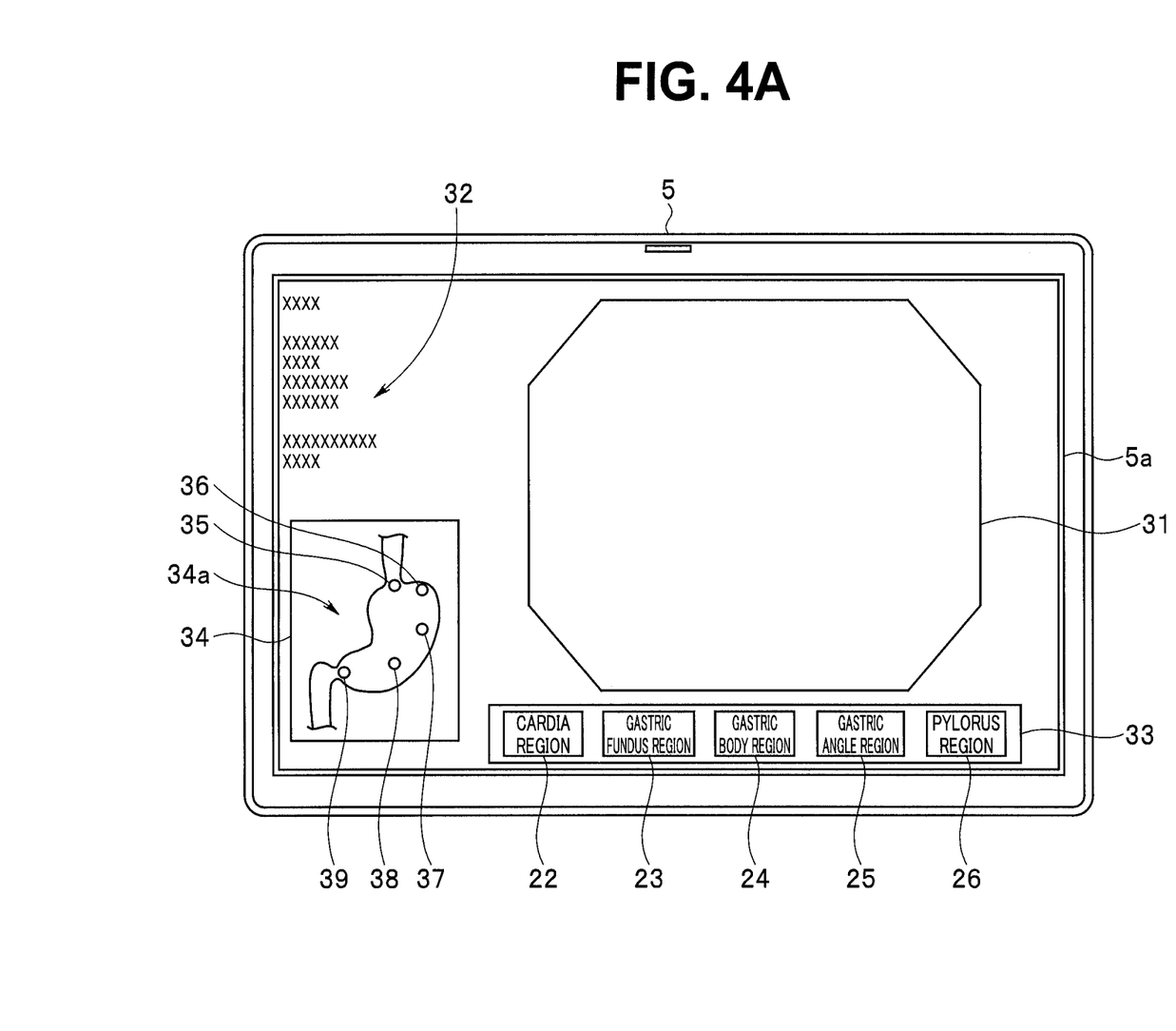
FIG. 4A is a view for explaining a display screen example displayed on a display screen of a display apparatus.

As shown in FIG. 4A, an endoscope image 31, patient information 32, inspection site information 33, and a thumbnail 34 are displayed on a display screen 5a of the display apparatus 5.

As the endoscope image 31, an image acquired by the image pickup unit 9 of the endoscope 2 is displayed. As the patient information 32, information such as a patient name, a gender and an age is displayed.

As the inspection site information 33, information on the cardia region 22, the gastric fundus region 23, the gastric body region 24, the gastric angle region 25, and the pylorus region 26 that are the predetermined inspection sites is displayed. On the thumbnail 34, a model image 34a of the stomach 21 is displayed. In the model image 34a, markers 35, 36, 37, 38, and 39 are displayed to correspond to respective positions of the cardia region 22, the gastric fundus region 23, the gastric body region 24, the gastric angle region 25, and the pylorus region 26 of the stomach 21.

Figure 4B:
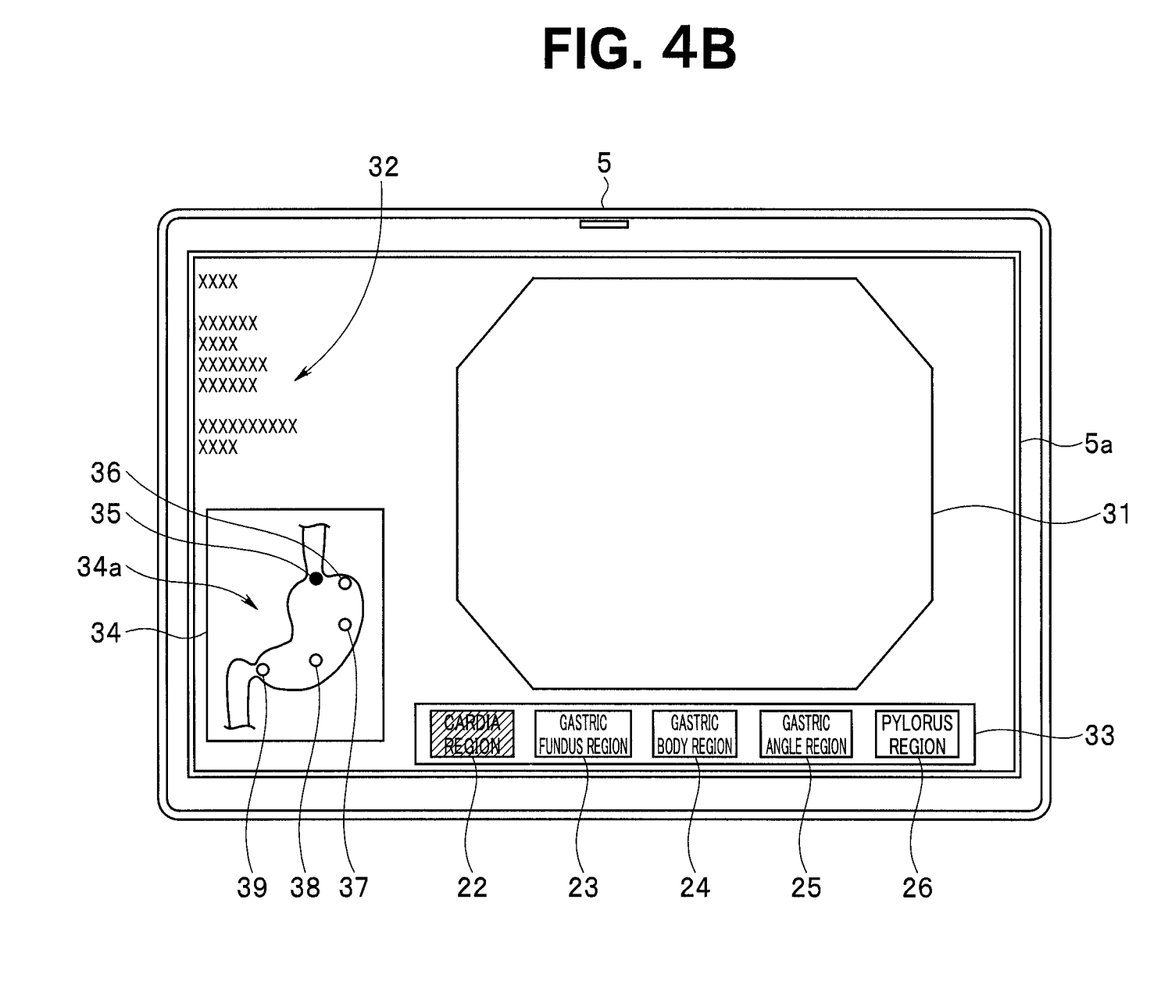
FIG. 4B is a view for explaining a display screen example displayed on the display screen of the display apparatus.

When an endoscope image in which the cardia region 22 is photographed is automatically recorded in the recording unit 19, the cardia region 22 of the inspection site information 33 is hatched as shown in FIG. 4B. In the model image 34a in the thumbnail 34, the marker 35 at a position corresponding to the cardia region 22 that is the inspection site automatically recorded is filled.

Figure 4C:
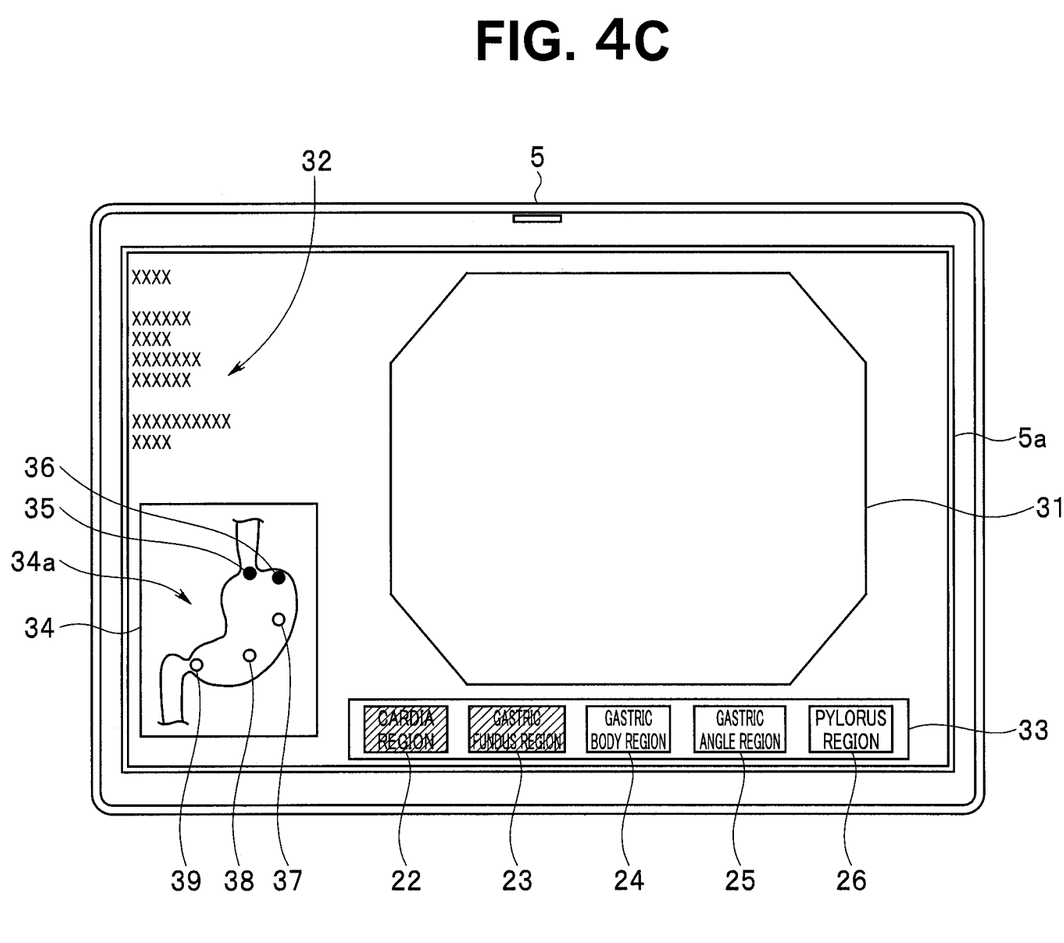
FIG. 4C is a view for explaining a display screen example displayed on the display screen of the display apparatus.

Next, when an endoscope image in which the gastric fundus region 23 is photographed is automatically recorded in the recording unit 19, the gastric fundus region 23 of the inspection site information 33 is hatched as shown in FIG. 4C. In the model image 34a in the thumbnail 34, the marker 36 at a position corresponding to the gastric fundus region 23 that is the inspection site automatically recorded is filled.

Figure 4D:
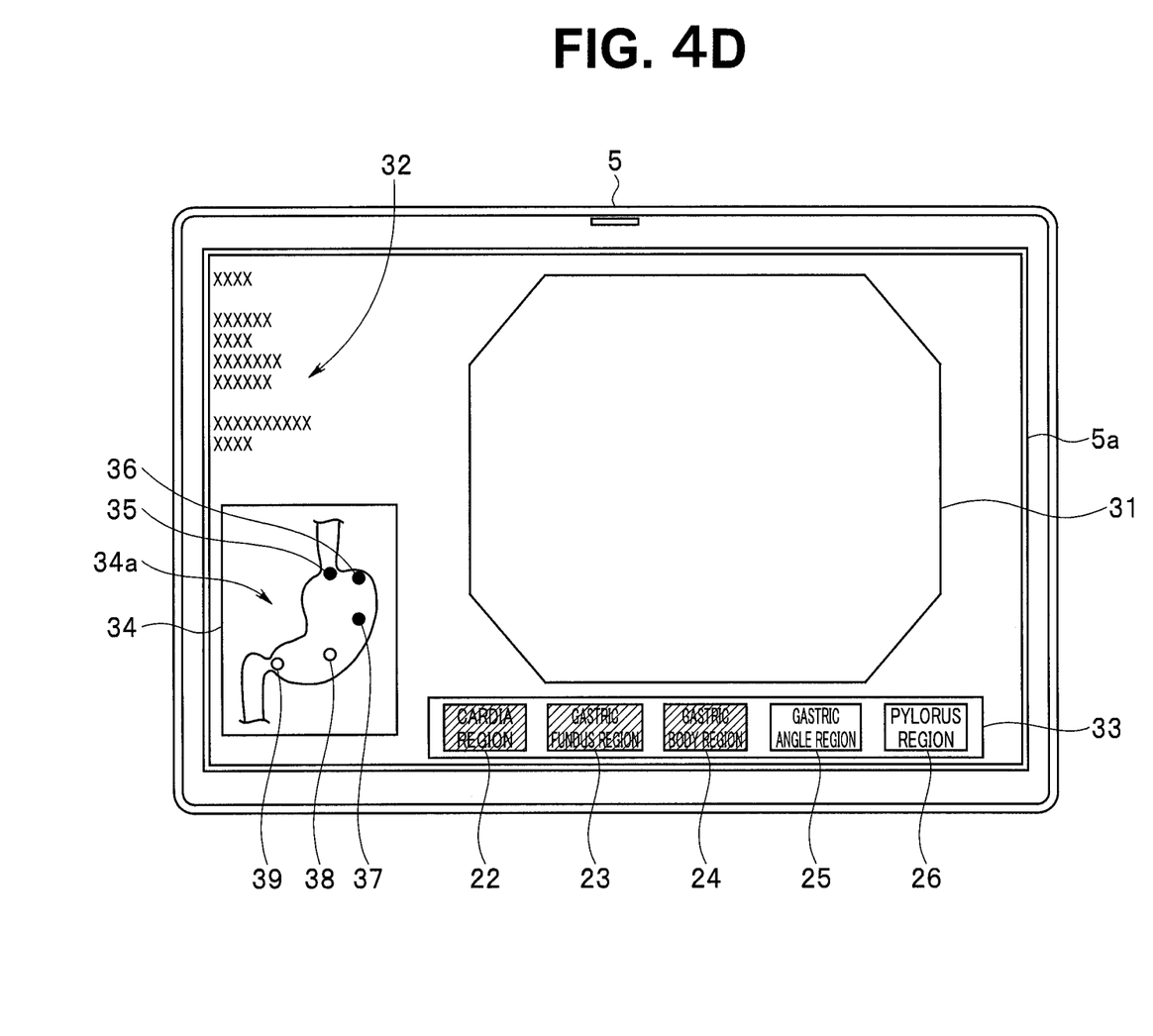
FIG. 4D is a view for explaining a display screen example displayed on the display screen of the display apparatus.

Next, when an endoscope image in which the gastric body region 24 is photographed is automatically recorded in the recording unit 19, the gastric body region 24 of the inspection site information 33 is hatched as shown in FIG. 4D. In the model image 34a in the thumbnail 34, the marker 37 at a position corresponding to the gastric body region 24 that is the inspection site automatically recorded is filled.

Figure 4E:
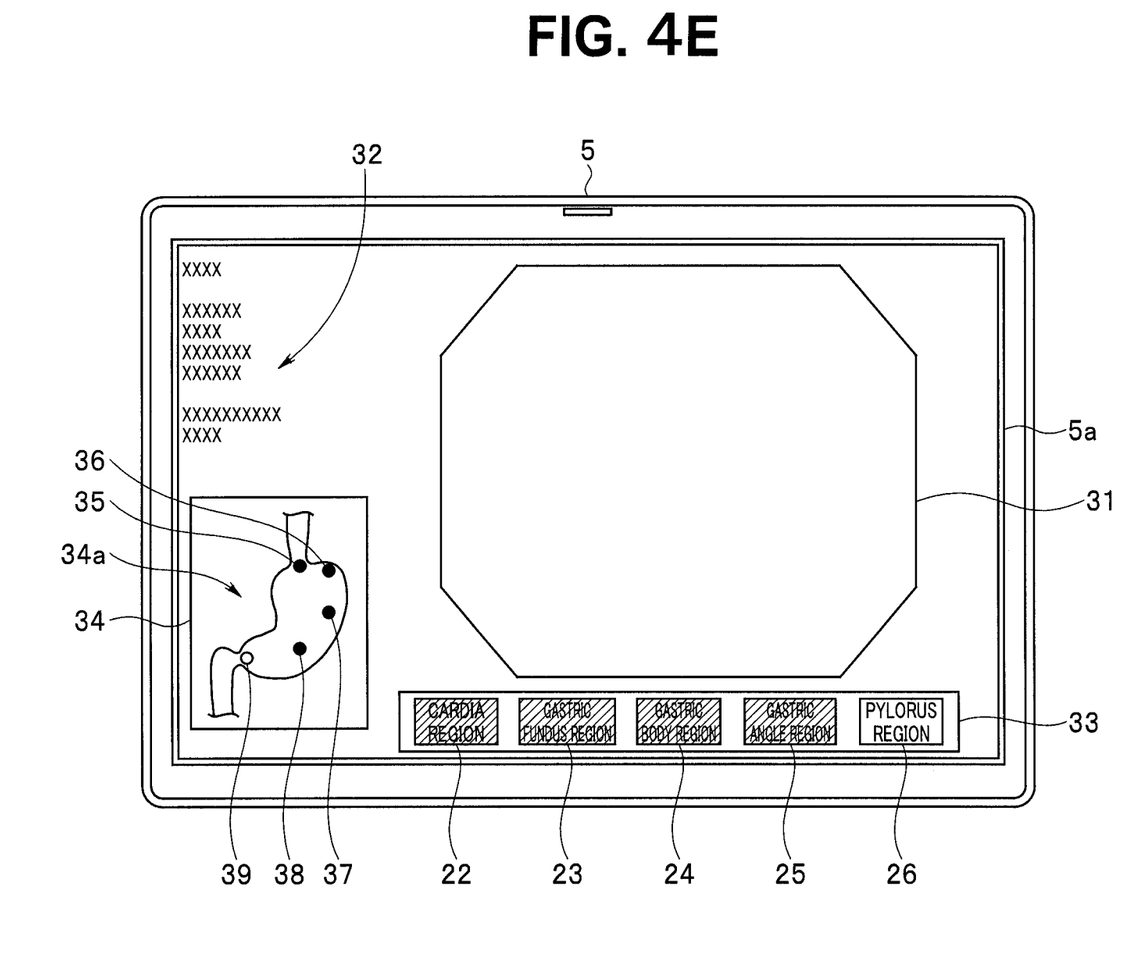
FIG. 4E is a view for explaining a display screen example displayed on the display screen of the display apparatus.

Next, when an endoscope image in which the gastric angle region 25 is photographed is automatically recorded in the recording unit 19, the gastric angle region 25 of the inspection site information 33 is hatched as shown in FIG. 4E. In the model image 34a in the thumbnail 34, the marker 38 at a position corresponding to the gastric angle region 25 that is the inspection site automatically recorded is filled.

Figure 4F:
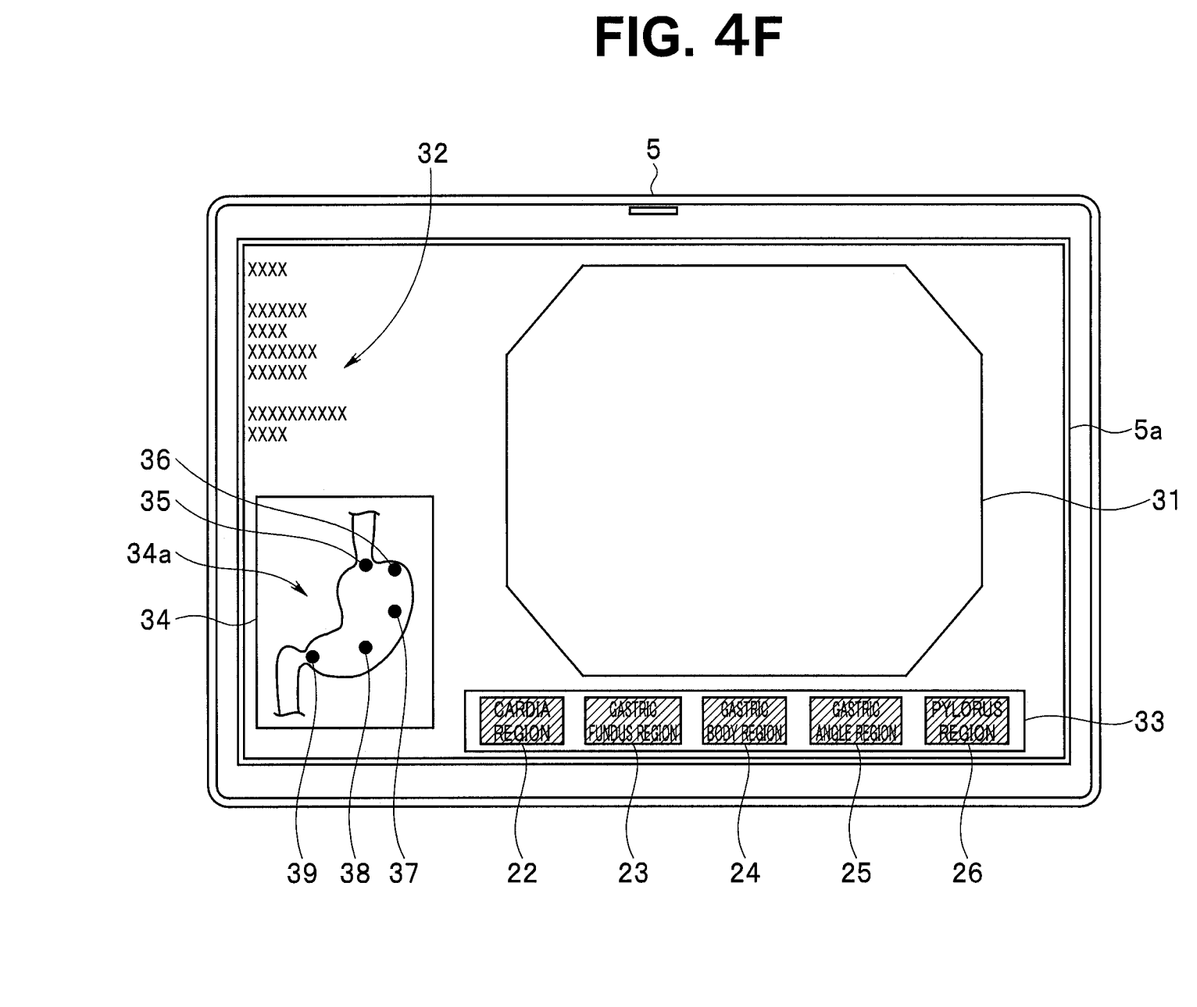
FIG. 4F is a view for explaining a display screen example displayed on the display screen of the display apparatus.

Next, when an endoscope image in which the pylorus region 26 is photographed is automatically recorded in the recording unit 19, the pylorus region 26 of the inspection site information 33 is hatched as shown in FIG. 4F. In the model image 34a in the thumbnail 34, the marker 39 at a position corresponding to the pylorus region 26 that is the inspection site automatically recorded is filled.

For example, when the endoscope image in which the gastric fundus region 23 is photographed is not recorded in the recording unit 19, the gastric fundus region 23 of the inspection site information 33 is in an unhatched state. In the model image 34a in the thumbnail 34, the marker 36 at the position corresponding to the gastric fundus region 23 is in an unfilled state. A doctor can easily grasp the inspection site, the endoscope image of which is not recorded in the recording unit 19, by confirming the inspection site information 33 and the thumbnail 34 that are displayed on the display screen 5a of the display apparatus 5.

For example, when the doctor grasps that there is a recording omission of the gastric fundus region 23 after the distal end portion 10 of the insertion portion 6 reaches the pylorus region 26, the doctor can perform image recording of the gastric fundus region 23 that is the inspection site, the recording omission of which occurs, when extracting the distal end portion 10 of the insertion portion 6.

Figure 5:
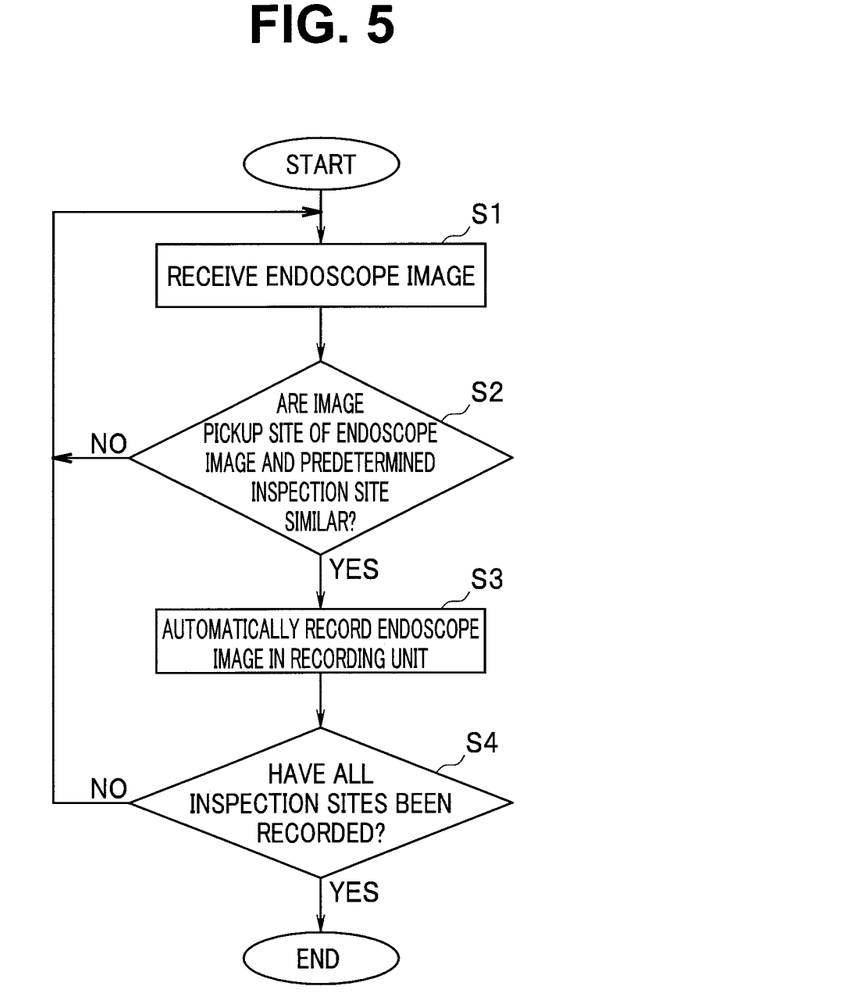
FIG. 5 is a flowchart for explaining an example of a flow of an automatic recording process of the first embodiment.

Next, an automatic recording process of the endoscope system configured in this way is described. FIG. 5 is a flowchart for explaining one example of a flow of the automatic recording process of the first embodiment.

The automatic recording process in FIG. 5 is performed by the CPU 15 that configures the processor reading the image processing program 18a from the ROM 18, developing the image processing program 18a into the RAM 17 and executing the image processing program 18a. Note that all or some of functions of the processor may be configured by using a logic circuit or an analogue circuit, and processes of various programs may be realized by electronic circuits such as an FPGA (field programmable gate array).

First, the CPU 15 receives an endoscope image in which an image of the inside of the body cavity of the subject P is picked up (S1). The process in S1 configures an input unit. The endoscope image is an image that is picked up by the image pickup unit 9 of the endoscope 2. The endoscope image picked up by the image pickup unit 9 is inputted to the CPU 15 via the I/F 16.

Next, the CPU 15 determines whether or not an endoscope image concerning predetermined inspection sites and image pickup sites of the endoscope images inputted to the input unit are same or similar (S2). The process in S2 configures a site determination unit. Here, the predetermined inspection sites are the cardia region 22, the gastric fundus region 23, the gastric body region 24, the gastric angle region 25, and the pylorus region 26 of the stomach 21, as described above.

More specifically, the site determination unit determines whether or not the endoscope image concerning the predetermined inspection sites and the image pickup sites of the endoscope images inputted to the input unit are the same or similar by using a deep learning model generated by deep learning. The site determination unit inputs the endoscope images to the deep learning model determining the sites of the stomach 21, and acquires inference results of the image pickup sites. The site determination unit determines whether or not the inspection sites and the image pickup sites are the same or similar from information on the inference results.

Note that the process in S2 may be executed on the server 14, for example. In other words, the deep learning model is stored in the server 14, and the CPU 15 transmits the endoscope image inputted to the input unit to the server 14 via the Internet 13, and determines whether or not the inspection sites and the image pickup sites are the same or similar on the server 14. When the CPU 15 receives a determination result from the server 14 via the Internet 13, and receives a determination result that the inspection sites and the image pickup sites are the same or similar, the CPU 15 automatically records the endoscope images inputted to the input unit in the recording unit 19.

Although the site determination unit performs determination of the image pickup sites by using the deep learning model generated by deep learning, the site determination unit may calculate similarity of the endoscope image accumulated in advance and the inputted endoscope images by using a similarity calculation algorithm such as a ZNCC (zero-mean normalized cross-correlation) algorithm, and may determine whether or not the image pickup sites are the predetermined inspection sites by using the calculated similarity, without being limited to the use of the deep learning model.

The CPU 15 returns to the process in S1 and repeats the same process, when it is determined that the inspection sites and the image pickup sites are not the same or similar by the site determination unit (S2: NO). On the other hand, when it is determined that the inspection sites and the image pickup sites are the same or similar by the site determination unit (S2: YES), the CPU 15 automatically records the endoscope images inputted to the input unit in the recording unit 19 (S3). The process in S3 configures an automatic recording unit. Note that a still image is recorded in the recording unit 19, but the image that is automatically recorded in the recording unit is not limited to the still image, and a moving image may be recorded.

Here, if a large number of endoscope images of the same inspection site are recorded in the recording unit 19, a recording capacity of the recording unit 19 will be squeezed, and a burden on a secondary reader will increase during a secondary examination.

Thus, the automatic recording unit automatically records a predetermined number (3 to 5, for example) of endoscope images that are determined to be the same or similar by the site determination unit, in the recording unit 19. As a result, the recording capacity of the recording unit 19 is not squeezed, and the burden on the secondary reader can be decreased.

Note that the automatic recording unit may select a representative image suitable for an observation image for each of the inspection sites from a plurality of endoscope images recorded in the recording unit 19, and may delete the endoscope images that are not selected from the recording unit 19. The automatic recording unit selects an image that is determined to be most similar to the predetermined inspection site as the representative image by the process in S2, for example. As a result, in each of the cardia region 22, the gastric fundus region 23, the gastric body region 24, the gastric angle region 25, and the pylorus region 26, only one representative image that is most suitable for observation is recorded in the recording unit 19.

When the automatic recording unit selects the representative image, the automatic recording unit may not record the images of the inspection site, the representative image of which is selected, in the recording unit 19 thereafter. In other words, when the automatic recording unit records the representative image of the cardia region 22 in the recording unit 19, the automatic recording unit does not record the endoscope image of the cardia region 22 in the recording unit 19 thereafter.

Finally, the CPU 15 determines whether or not all the predetermined inspection sites are recorded (S4). When the CPU 15 determines that all the predetermined inspection sites are not recorded (S4: NO), the CPU 15 returns to the process in S1 and repeats the same process. On the other hand, when the CPU 15 determines that all the predetermined inspection sites are recorded (S4: YES), the CPU 15 ends the automatic recording process.

By the above processes, it is determined whether or not the endoscope images concerning the predetermined inspection sites and the image pickup sites of the endoscope images inputted to the input unit are the same or similar, and the endoscope images that are determined to be the same or similar are automatically recorded in the recording unit 19.

Consequently, according to the image processing apparatus of the present embodiment, the endoscope image in which the predetermined inspection site is photographed can be automatically recorded.

By executing the automatic recording process described in the above by the image processing apparatus of the present embodiment, it is possible to prevent omission of recording of the endoscope image in which the inspection site that needs recording is photographed. As a result, the doctor can concentrate on endoscopy because the doctor does not have to worry about omission of recording of the endoscope images during endoscopy.

Second Embodiment

Next, a second embodiment is described.

An entire configuration of the second embodiment is the same as the entire configuration of the first embodiment. In the second embodiment, an automatic recording process differs from the automatic recording process of the first embodiment. In the first embodiment, it is determined whether or not the predetermined inspection sites and the image pickup sites in the endoscope images are the same or similar and automatic recording is executed. In contrast to this, in the second embodiment, it is determined whether or not predetermined inspection sites and image pickup sites in endoscope images are same or similar and determination of whether or not conditions are suitable for automatic recording is performed, after which, automatic recording is executed.

Figure 6:
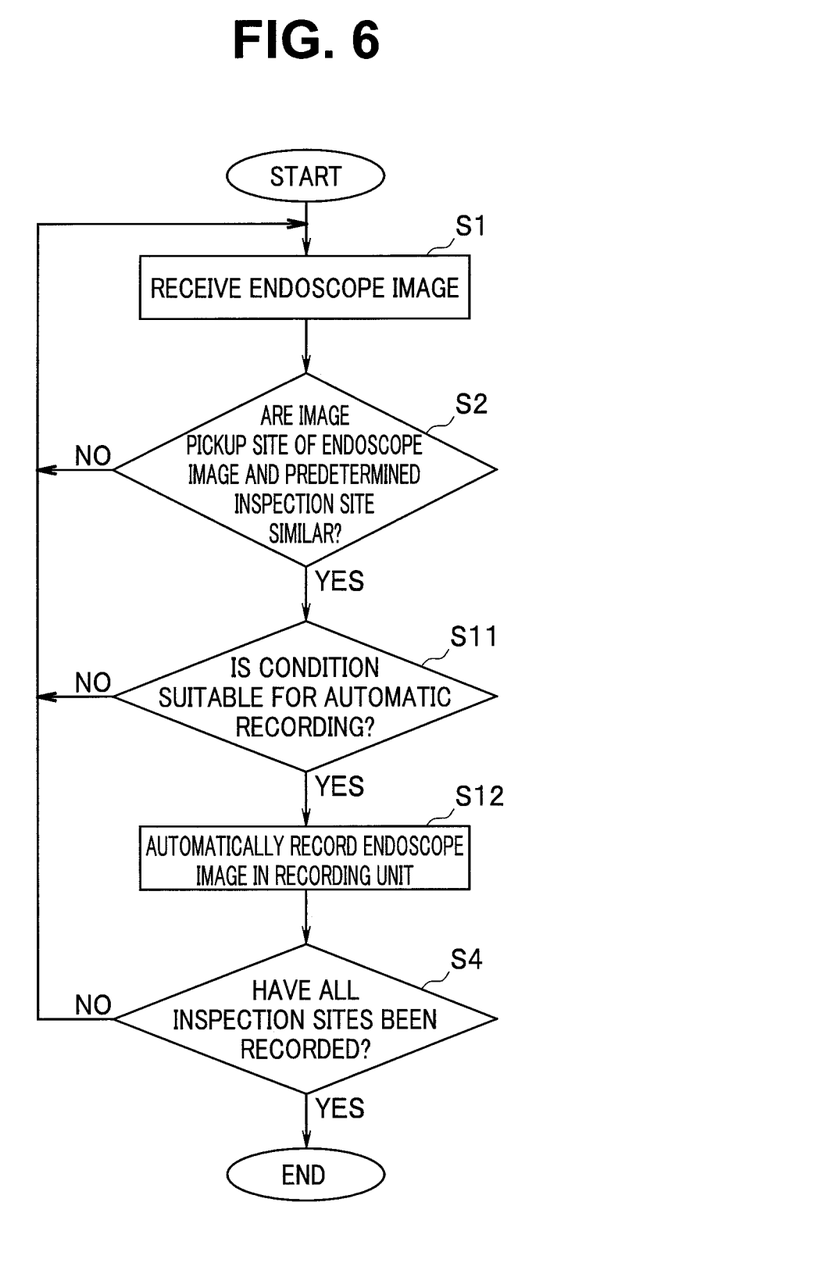
FIG. 6 is a flowchart for explaining one example of a flow of an automatic recording process of a second embodiment.

FIG. 6 is a flowchart for explaining one example of a flow of an automatic recording process of the second embodiment. Note that in FIG. 6, same processes as the processes in FIG. 5 are designated by the same reference signs and explanation is omitted.

When a site determination unit determines that an image pickup site in an endoscope image and a predetermined inspection site are similar by a process of S2, a CPU 15 determines whether or not a condition is suitable for automatic recording (S11). A process in S11 configures a condition determination unit.

More specifically, the condition determination unit acquires a set value of a light source from a light source setting unit. The condition determination unit acquires whether the set value of the light source is a set value of normal light observation (white light imaging: WLI) or a set value of narrow band light observation (narrow band imaging: NBI). For example, when the set value of the normal light observation is set, the condition determination unit determines that the condition is not suitable for automatic recording, and when the set value of the narrow band light observation is set, the condition determination unit determines that the condition is suitable for automatic recording. Note that the set value of the light source may be a set value of another special light observation without being limited to the set value of the normal light observation (white light imaging: WLI) and the set value of the narrow band light observation (narrow band imaging: NBI).

When the condition determination unit determines that the condition is not suitable for automatic recording (S11: NO), the CPU 15 returns to a process in S1, and repeats the same process. On the other hand, when the condition determination unit determines that the condition is suitable for automatic recording (S11: YES), the CPU 15 proceeds to a process in S12.

When the site determination unit determines that the image pickup site in the endoscope image and the predetermined inspection site are the same or similar and when the condition determination unit determines that the condition is suitable for automatic recording, the CPU 15 automatically records the endoscope image inputted to an input unit in a recording unit 19 (S12). The process in S12 configures an automatic recording unit.

Here, the automatic recording unit records only a predetermined number of endoscope images in the recording unit 19 as in the first embodiment. The predetermined number of endoscope images are determined to be the same or similar by the site determination unit, and are under the condition determined to be suitable for automatic recording by the condition determination unit.

Note that the automatic recording unit may select a representative image suitable for an observation image from the plurality of endoscope images that are recorded in the recording unit 19 for each of the inspection sites, and may delete the endoscope images that are not selected from the recording unit 19, as in the first embodiment. When the automatic recording unit selects the representative image, the automatic recording unit may not record the image of the inspection site, the representative image of which is selected, in the recording unit 19 thereafter.

Finally, when the CPU 15 determines that all the inspection sites are not recorded in a process in S4, the CPU 15 returns to the process in S1, and when the CPU 15 determines that all the inspection sites are recorded, the CPU 15 ends the automatic recording process.

Note that the condition suitable for automatic recording may be another condition without being limited to the set value of the light source.

The condition determination unit may determine whether or not the condition is suitable for automatic recording according to a distance between a distal end portion 10 of an endoscope and an image pickup site that is acquired by a distance acquisition unit.

For example, the condition determination unit determines that the condition is suitable for automatic recording when the distance between the distal end portion 10 of the endoscope and the image pickup site that is acquired by the distance acquisition unit is a predetermined value or less. On the other hand, when the distance between the distal end portion 10 of the endoscope and the image pickup site that is acquired by the distance acquisition unit is larger than the predetermined value, the condition determination unit determines that the condition is not suitable for automatic recording.

Further, the condition determination unit may determine whether or not a condition is suitable for automatic recording according to a direction of an image pickup site to an endoscope that is estimated by a direction estimation unit configured to estimate a direction of the image pickup site to the endoscope.

For example, when the direction estimation unit estimates that the direction of the image pickup site is oriented in a predetermined direction, the condition determination unit determines that the condition is suitable for automatic recording. On the other hand, when the direction estimation unit estimates that the direction of the image pickup site is not oriented in the predetermined direction, the condition determination unit determines that the condition is not suitable for automatic recording.

The condition determination unit may determine whether or not the condition is suitable for automatic recording according to a kind of an object detected by an object detection unit configured to detect an object from an endoscope image inputted to the input unit. The object detected by the object detection unit is a lesion region, a mucosal region, an unwanted material (food residue, foam or the like) region, a dark region, a halation region or the like.

For example, when the object detection unit detects a lesion region or a mucosal region, the condition determination unit determines that the condition is suitable for automatic recording. On the other hand, when the object detection unit detects an unwanted region, a dark region, or a halation region, the condition determination unit determines that the condition is not suitable for automatic recording.

Note that a program executing the operations described above is entirely or partially recorded or stored in a non-transitory computer-readable storage medium such as a portable medium such as a flexible disk or a CD-ROM, or a hard disk. Program codes of the program are read by a computer and all or some of the operations are executed. Alternatively, a whole or part of the program can be distributed or provided via communication networks. A user can easily realize the image processing apparatus of the present invention by downloading the program via a communication network and installing the program on the computer, or by installing the program on the computer from a recording medium.

The respective steps in the flowcharts in the present description may be executed in plurality at the same time by changing the execution order, or may be executed in a different order for each execution, as long as such a change does not violate the nature of the steps.

The present invention is not limited to the aforementioned embodiments, and various changes, alterations and the like are possible within the range without departing from the gist of the present invention.

What is claimed is:

1. An image processing apparatus comprising:
a processor comprising hardware, wherein the processor is configured to:
in a primary examination,
receive endoscope images to be determined, in each of which an image of an inside of a body of a subject is picked up;
receive a set value of a light source when each of the endoscope images to be determined is picked up;
determine whether or not an endoscope image for comparison concerning a predetermined inspection site, and the endoscope images to be determined are same or similar;
determine whether or not the set value of the light source as an observation mode of each of the endoscope images to be determined is a condition suitable for automatic recording; and
automatically record a predetermined number of the endoscope images to be determined in a recording unit, when the endoscope images to be determined and the endoscope image for comparison are determined to be the same or similar and when the observation mode is the condition suitable for automatic recording,
wherein the endoscope images to be determined are recorded in the recording unit as images to be used for a secondary examination to be performed after the primary examination.

2. The image processing apparatus according to claim 1, wherein the processor is configured to determine whether or not the observation mode is the condition suitable for the automatic recording according to a distance between a distal end portion of an endoscope and an image pickup site.

3. The image processing apparatus according to claim 1, wherein the processor is configured to determine whether or not the observation mode is the condition suitable for the automatic recording according to a direction of an image pickup site to an endoscope.

4. The image processing apparatus according to claim 1, wherein the processor is configured to determine whether or not the observation mode is the condition suitable for the automatic recording according to a kind of objects detected from the endoscope images to be determined.

5. The image processing apparatus according to claim 1, wherein the processor is configured to select and record a representative image suitable for observation from the predetermined number of the endoscope images to be determined that are recorded.

6. The image processing apparatus according to claim 5, wherein the processor is configured to delete the endoscope images that are not selected as the representative image among the predetermined number of the endoscope images from the recording unit.

7. The image processing apparatus according to claim 5, wherein the processor is configured to select the representative image for each inspection site.

8. The image processing apparatus according to claim 5, wherein the processor is configured to not record an endoscope image concerning the inspection site, the representative image of which is selected, in the recording unit, after selecting the representative image.

9. The image processing apparatus according to claim 1, wherein the predetermined inspection site is a stomach.

10. The image processing apparatus according to claim 9, wherein the predetermined inspection site is a cardia region, a gastric fundus region, a gastric body region, a gastric angle region and a pylorus region of the stomach.

11. The image processing apparatus according to claim 1, wherein the predetermined inspection site is a pharynx, an esophagus, a small intestine, or a large intestine.

12. An image processing method comprising:

in a primary examination,
  receiving endoscope images to be determined, in each of which an image of an inside of a body of a subject is picked up;
  receiving a set value of a light source when each of the endoscope images to be determined is picked up;
  determining whether or not an endoscope image for comparison concerning a predetermined inspection site, and the endoscope images to be determined are same or similar;
  determining whether or not the set value of the light source as an observation mode of each of the endoscope images to be determined is a condition suitable for automatic recording; and
  automatically recording a predetermined number of the endoscope images to be determined in a recording unit, when the endoscope image for comparison and the endoscope images to be determined are determined to be the same or similar and when the observation mode is the condition suitable for the automatic recording,
  wherein the endoscope images to be determined are recorded in the recording unit as images to be used for a secondary examination to be performed after the primary examination.

13. A non-transitory recording medium in which an image processing program is stored, the image processing program, when executed, causes a computer to at least execute:

in a primary examination,
  receiving endoscope images to be determined, in each of which an image of an inside of a body of a subject is picked up;
  receiving a set value of a light source when each of the endoscope images to be determined is picked up;
  determining whether or not an endoscope image for comparison concerning a predetermined inspection site, and the endoscope images to be determined are same or similar;
  determining whether or not the set value of the light source as an observation mode of each of the endoscope images to be determined is a condition suitable for automatic recording; and
  automatically recording a predetermined number of the endoscope images to be determined in a recording unit, when the endoscope image for comparison and the endoscope images to be determined are determined to be the same or similar and when the observation mode is determined to be the conditions suitable for automatic recording,
  wherein the endoscope images to be determined are recorded in the recording unit as images to be used for a secondary examination to be performed after the primary examination.

* * * * *